United States Patent [19]

Clapp et al.

[11] 4,190,968

[45] Mar. 4, 1980

[54] TRAINING DEVICE FOR HORSEMANSHIP

[76] Inventors: Ronald E. Clapp, 12918 Marine Ave., Creve Coeur, Mo. 63141; David L. Cunningham, 2238 Murray Forest Dr., Maryland Heights, Mo. 63043

[21] Appl. No.: 948,420

[22] Filed: Oct. 4, 1978

[51] Int. Cl.² .......................................... G08B 21/00
[52] U.S. Cl. .................................. 35/29 R; 119/29; 340/573
[58] Field of Search ............... 35/29 R; 272/DIG. 6; 340/573; 119/29; 54/71

[56] References Cited

U.S. PATENT DOCUMENTS

| 2,604,559 | 7/1952 | Shapiro | 340/573 X |
| 3,161,005 | 12/1964 | Ackerson | 119/29 X |
| 3,644,919 | 2/1972 | Mathauser | 35/29 R X |
| 3,670,320 | 6/1972 | Palmer | 340/573 |

OTHER PUBLICATIONS

L. A. Geddes, "Gaits of Horses: Marey's Studies" p. 152 of Science, vol. 151, 14 Jan. 1966.

Primary Examiner—Harland S. Skogquist
Attorney, Agent, or Firm—Fred Philpitt

[57] ABSTRACT

A device for teaching horsemanship by providing visual indication activated by pressure switches to a rider for monitoring the way in which the horse is moving.

1 Claim, 4 Drawing Figures

TRAINING DEVICE FOR HORSEMANSHIP

BACKGROUND

In order to appreciate the present invention it is necessary to first clearly understand some of the specialized terms used in horsemanship and horse training.

A "canter" is a three-beat gait also known as a collected gallop.

When a horse is in a canter or lope, there are different stride patterns known as "leads." For example, when the horse is in the right lead the horse's right front and right hind leg lead or stride out further than the left fore and left hind leg. Traveling in the incorrect lead is not only awkward and uncomfortable for horse and rider but is penalized at horse shows. A "lead change" is when a horse is circling to the right or to the left, the horse simply changes from a right lead to a left lead, or changes from a left lead to a right lead.

A "trot" is a two-beat gait where the horse's legs move in "diagonals."

"Posting" is the rising and descending of the rider through knee action. Posting is done in rhythm with the horse's trot.

"Diagonals" occur where at a trot the horse's legs move in diagonal pairs. When a rider is posting he will post to either the right or left diagonal. Posting to the incorrect diagonal makes riding more difficult and is penalized at horse shows as a mistake.

A "breast collar" is a leather strap that wraps around the horse's chest and is attached to each side of the saddle.

In the teaching of horsemanship and in the training of horses it is often found that many horsemen, and especially beginning horsemen, have great difficulty in mastering and/or distinguishing between correct "leads" and proper "diagonals." The ability to distinguish proper leads and diagonals is essential to the basic fundamentals of good horsemanship whether riding for pleasure or as an exhibitor in a horse show.

THE PRESENT INVENTION

The present inventors felt that a mechanical device could be developed which would assist horsemen insofar as mastering correct "leads," "proper diagonals," and other aspects of good horsemanship.

Considered from one standpoint, the present invention involves a device useful in connection with teaching horsemanship comprising in combination:

(a) a first pressure activated switch, (b) a second pressure activated switch, (c) means for supporting said first pressure activated switch closely adjacent the left chest-shoulder area of a horse and for supporting said second pressure activated switch closely adjacent the right chest-shoulder area of a horse, (d) an indicator means mounted on a portion of the horse where it can be easily viewed by a rider of the horse, and (e) electrical circuitry interconnecting said indicator means and said pressure activated switches.

It is believed that the invention can be more clearly understood by reference to the attached drawings wherein FIG. 1 is a perspective view generally showing how the present invention would be mounted on a horse;

Figure 1:
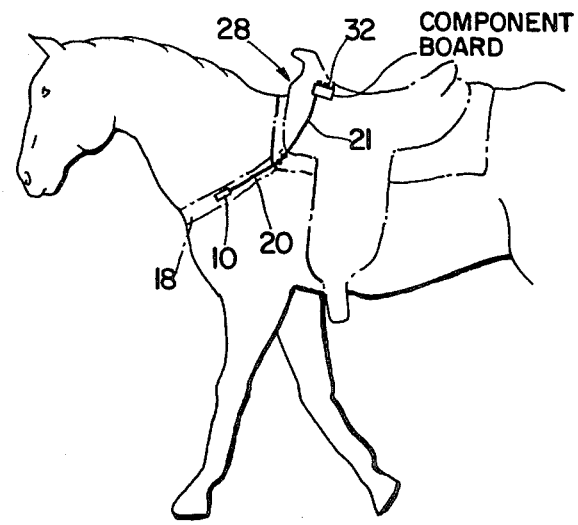

With specific reference to the drawings a first rock wipe contact action pressure activated switch 10 and a second rock wipe contact action pressure activated switch 12 are shown. These pressure activated switches can be of any suitable type which are normally open but which are closed when pressure is exerted against the switch contact. They are enclosed in leather envelopes to avoid discomfort to the horse when using a regular breast collar. Pressure activated switches of this type are well known and are readily available in small sizes.

The pressure activated switch should preferably be located over the deltoid or triceps brachil or brachiocephalicus muscle of the horse which are located on and near the shoulder blade. Suitable adjustment means can be provided to achieve this. The pressure switches can be placed anywhere on the breast collar and will function. Accurate results are easily obtained when the switches are placed on or near the shoulder blade and surrounding muscles.

Pressure activated switches 10 and 12 are seen to be supported on the front portion of a horse, the first pressure activated switch 10 being supported closely adjacent the left chest-shoulder area of the horse and the second pressure activated switch 12 being supported closely adjacent the right chest-shoulder area of the horse. As shown, the support means for switches 10 and 12 includes small leather pockets 14 and 16 located at spaced apart locations on a breast collar 18. The leather pockets 14 and 16 are mounted on the back side of the breast collar 18 so that the switches will be closely adjacent the chest-shoulder of the horse. Enclosing the switches 10 and 12 in leather pockets is one means of securing them to the breast collar and avoids discomfort to the horse. As shown the breast collar 18 is disposed across and around the chest-shoulder portion of a horse. The ends 24 and 26 of the breast collar are shown as being attached to opposite sides of the saddle mounting 28.

The drawings also show that an indicator means 30 is provided. The indicator means illustrated is a small light bulb. This indicator means is preferably mounted on some sort of support means which can be positioned so that the indicator means can be easily viewed by a rider of the horse. The support means 32 for the indicator means 30 illustrated in the drawings comprises of a foam block 31 and a fiberboard 34. Other types of support means would be equally satisfactory.

Figure 2:
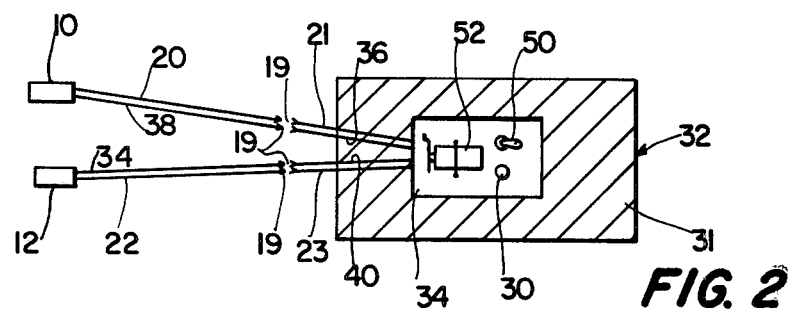
FIG. 2 is a plan view showing the essential components of the present invention.
Figure 3:
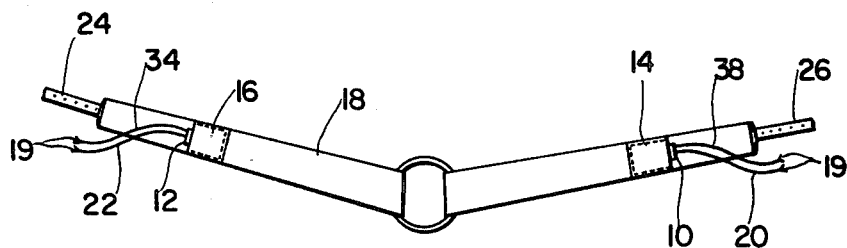
FIG. 3 is a view showing how the pressure activated switches may be mounted in a supporting means.
Figure 4:
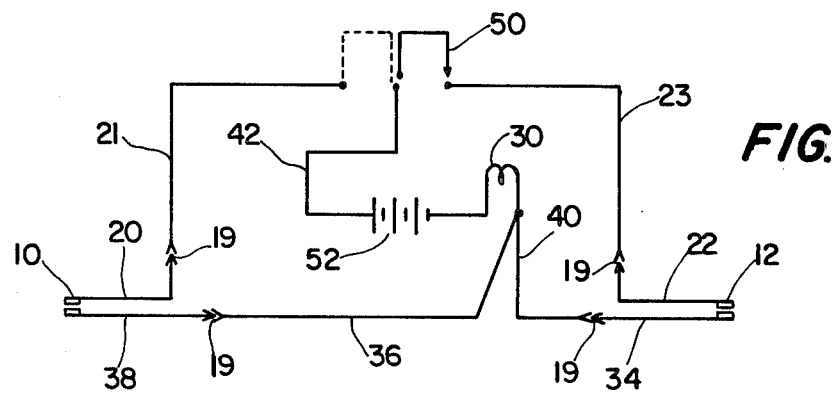
FIG. 4 is a detailed view which shows in greater detail the way in which the components of the present invention are electrically connected.

An electrical circuit is provided to interconnect said indicator means and said pressure activated switches. With particular reference to FIGS. 2 and 4 it will be seen that the electrical circuitry includes wires 20, 21, 22, 23, 34, 36, 38, 40 and 42, a power source 52 and a single pole, double throw, center-off switch 50. Any desired number of snap connectors 19 may be used in the electrical circuitry in order to facilitate either inactivation, removal or substitution of components. The power source 52 is preferably a low voltage battery, such as a nine volt battery, so that there is no hazard to either the horse or rider.

As noted previously, the indicator means of the present invention is mounted on a support means 32 and this support means is preferably mounted on or closely adjacent to the saddle so that the status of the indicator means 30 (i.e. lighted or unlighted) is always evident to the rider. This location of the support means 32 also makes the switch 50 readily available to the rider so that the rider can put switch 50 either in its left position (completing the right half of the circuit when switch 10 is closed) or in its right position (completing the left half of the circuit when the switch 12 is closed) or in its center position wherein no power will flow through the system regardless of the position of switches 10 and 12.

The present invention permits one who is riding a horse at a canter to obtain a visual indication as to whether the front lead of the horse is correct or incorrect. The present invention also permits one who is riding a horse at a trot to obtain a visual indication as to which diagonal to post and to thereby establish a means to improve the rider's posting technique and timing. The present invention further permits one who is riding a horse to obtain a visual indication as to the proper time to cue the horse for lead changes. The present invention additionally permits one who is riding a horse to obtain a visual indication as to the position of the horse's hooves, regardless of the training purpose the rider may have in mind.

With the switch in the left position the device will monitor the right lead while the horse is in a counter-clockwise course at a canter. With the switch in the right position the device will monitor the left lead while the horse is in a clockwise course at a canter. With the S.P.D.T. center off switch in the correct mode, the monitor's indicator light will flash should the horse begin the wrong lead. When travelling at a trot in a counter-clockwise course with the switch in the right position, the rider should post with the flashing of the light. When travelling at a trot in a clockwise course with the switch in the left position, the rider should post with the flashing of the light. While monitoring the correct lead following a serpentine or FIG. 8 course at a canter, the rider will move the switch to the opposite position and by observing the light will recognize the opportune time to cue the horse for the lead change.

The device of the present invention can be utilized by the inexperienced rider who is riding a well-trained horse. The rider can practice and perfect correct riding skills without untraining the horse. As an example—a rider that causes, or allows a horse to take a wrong lead and allows the horse to continue taking incorrect leads is "untraining" the horse.

Experienced riders (and many inexperienced riders) often rely on watching the horse's shoulder blades as an indication of lead correctness. A close strided horse is always a problem for both types of riders in distinguishing lead correctness. The device of the present invention would give a true visual and immediate indication with the first stride.

Although many approaches are used in cueing horses for lead changes, the device of the present invention offers instant and accurate assistance to whatever approach is chosen by visually indicating the position of each hoof to the rider.

What we claim is:
1. A device useful in connection with teaching horsemanship comprising in combination:
    (a) a first pressure activated switch,
    (b) a second pressure activated switch,
    (c) means for supporting said first pressure activated switch closely adjacent the left chest-shoulder area of a horse and for supporting said second pressure activated switch closely adjacent the right chest-shoulder area of a horse,
    (d) an indicator means mounted on a portion of the horse where it can be easily viewed by a rider of the horse, and
    (e) electrical circuitry interconnecting said indicator means and said pressure activated switches.

* * * * *